(12) United States Patent
Kikuchi

(10) Patent No.: US 8,305,467 B2
(45) Date of Patent: Nov. 6, 2012

(54) IMAGE PICKUP APPARATUS AND IMAGE PICKUP METHOD

(75) Inventor: Kenichi Kikuchi, Kawanishi (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 120 days.

(21) Appl. No.: 12/870,143

(22) Filed: Aug. 27, 2010

(65) Prior Publication Data

US 2011/0050964 A1    Mar. 3, 2011

(30) Foreign Application Priority Data

Aug. 31, 2009  (JP) ................................ 2009-199955

(51) Int. Cl.
*H04N 5/262*  (2006.01)

(52) U.S. Cl. ............. 348/240.1; 348/240.99; 348/222.1; 348/231.99

(58) Field of Classification Search ................ 348/240.1, 348/240.99, 222.1, 231.99
See application file for complete search history.

(56) References Cited

U.S. PATENT DOCUMENTS

2006/0262203 A1 * 11/2006 Bae .......................... 348/240.99

FOREIGN PATENT DOCUMENTS

JP    2007-228101 A    9/2007

* cited by examiner

*Primary Examiner* — Yogesh Aggarwal
(74) *Attorney, Agent, or Firm* — Westerman, Hattori, Daniels & Adrian, LLP

(57) ABSTRACT

An image pickup apparatus includes an image pickup unit which forms a subject image on an image pickup device through an optical system to generate an image pickup signal; an adjustment unit which changes an optical zoom magnification with respect to the subject image; and a control unit which records image data as a moving image in a memory in response to a moving image recording command, the image data being obtained based on the image pickup signal, and stops recording the moving image for a time period during which the zoom magnification is changed.

6 Claims, 5 Drawing Sheets

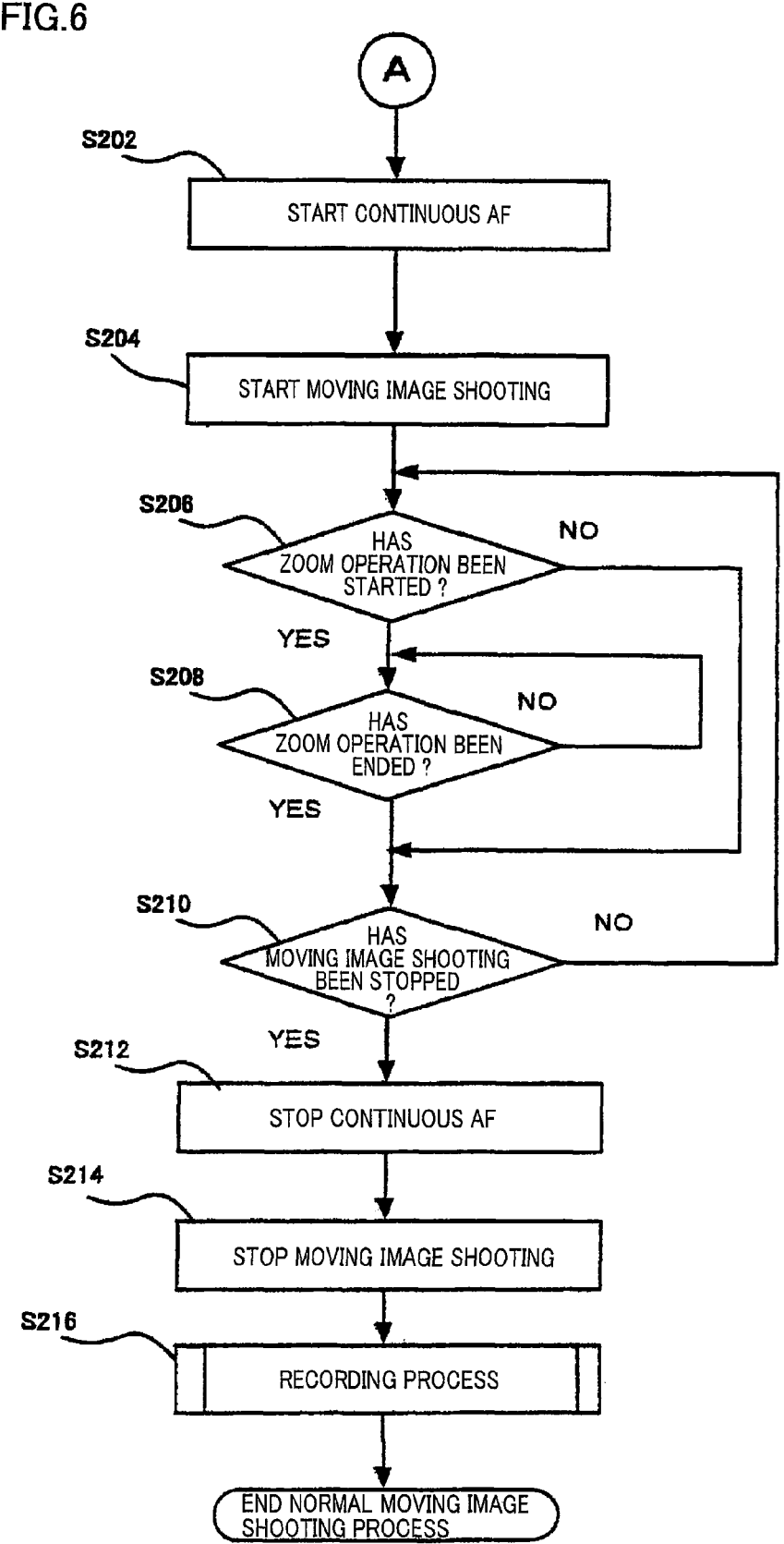

IMAGE PICKUP APPARATUS AND IMAGE PICKUP METHOD

This nonprovisional application is based on Japanese Patent Application No. 2009-199955 filed on Aug. 31, 2009, with the Japan Patent Office, the entire contents of which are hereby incorporated by reference.

BACKGROUND OF THE INVENTION

1. Field of the Invention

The present invention relates to an image pickup apparatus and an image pickup method, and more particularly to a camera having a function of recording a moving image and an image pickup method of the camera.

2. Description of the Related Art

Conventionally, when an electronic camera performs a zoom operation during moving image shooting, sound is caused by driving a lens in the zoom or focus operation and may be recorded as noise. In the case of the moving image shooting by an electronic camera, the zoom operation is performed for setting the angle of view of the target to be shot. Accordingly, it is considered that image shooting may often be started after the angle of view is determined.

An apparatus for improving encoding efficiency by setting the evaluation value of motion to the minimal block size in accordance with the zoom operation of the camera is known. However, neither the problem of the electronic camera that sound caused by driving the lens in the zoom or focus operation is recorded as noise, nor an approach to solving this problem is known.

SUMMARY OF THE INVENTION

According to an aspect of the present invention, an image pickup apparatus includes an image pickup unit which forms a subject image on an image pickup device through an optical system to generate an image pickup signal; an adjustment unit which changes an optical zoom magnification with respect to the subject image; and a control unit which records image data as a moving image in a memory in response to a moving image recording command, the image data being obtained based on the image pickup signal, and stops recording the moving image for a time period during which the zoom magnification is changed.

According to another aspect of the present invention, an image pickup method of an image pickup apparatus is provided. The image pickup apparatus includes an image pickup unit which forms a subject image on an image pickup device through an optical system to generate an image pickup signal; an adjustment unit which changes an optical zoom magnification with respect to the subject image; and a control unit. The image pickup method includes the steps of the control unit recording image data as a moving image in a memory in response to a moving image recording command, the image data being obtained based on the image pickup signal; and the control unit stopping recording the moving image for a time period during which the zoom magnification is changed.

The foregoing objects, features, aspects and advantages of the present invention will become more apparent from the following detailed description of the present invention when taken in conjunction with the accompanying drawings.

BRIEF DESCRIPTION OF THE DRAWINGS

FIG. 6 is a flowchart illustrating the processing procedure of the CPU of the electronic camera in the normal moving image mode according to the present embodiment.

DESCRIPTION OF THE PREFERRED EMBODIMENTS

Figure 1:
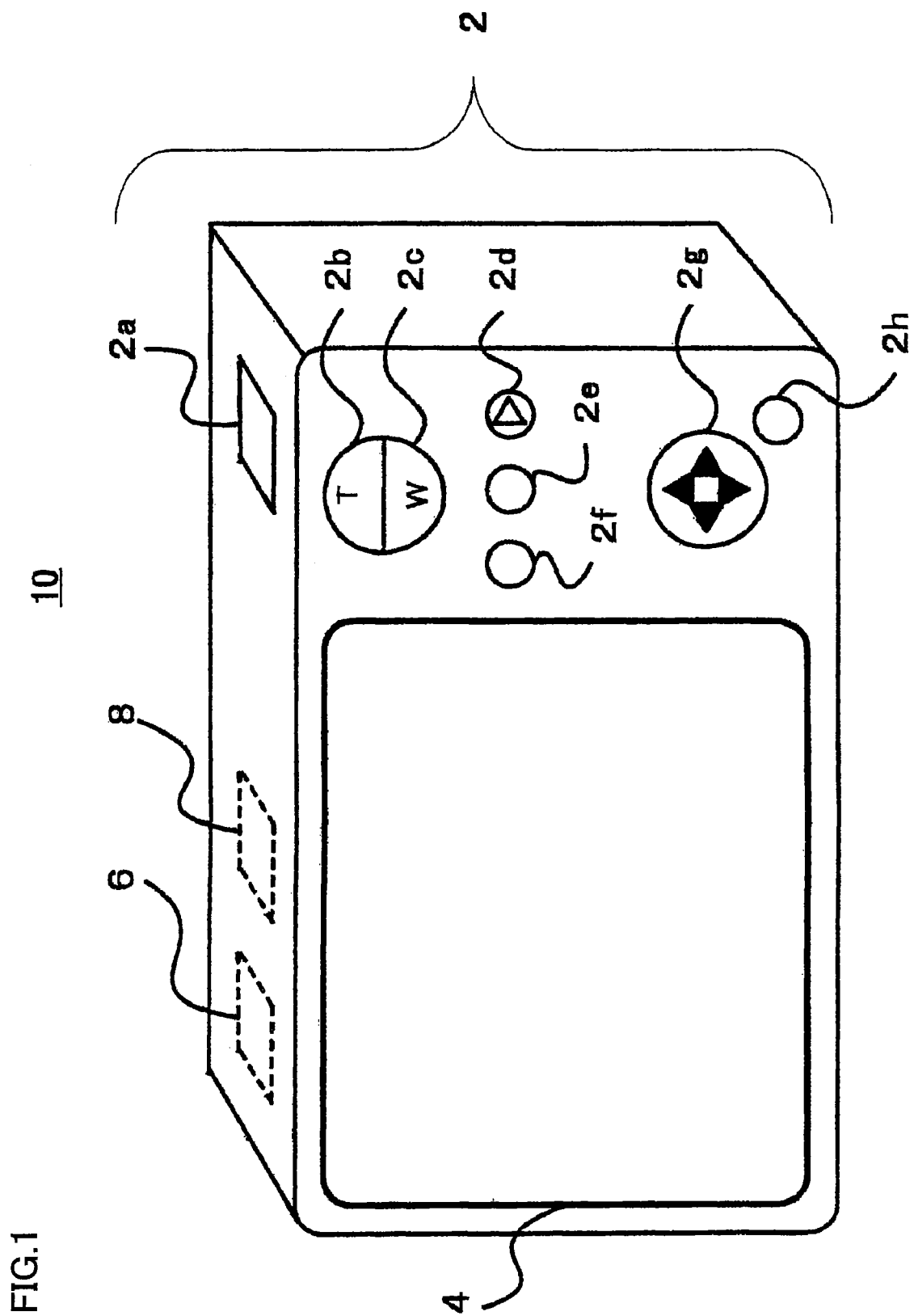
FIG. 1 is an external view showing the external appearance of an electronic camera according to the present embodiment.

The embodiments of the present invention will be hereinafter described in detail with reference to the accompanying drawings, in which the same or corresponding components are designated by the same reference characters, and description thereof will not be repeated.

As one embodiment of the image pickup apparatus according to the present invention, an electronic camera 10 will be hereinafter specifically described with reference to the accompanying drawings. FIG. 1 is an external view showing the external appearance of the electronic camera according to the present embodiment.

Referring to FIG. 1, electronic camera 10 includes at least an image pickup unit which is not shown, an operation unit 2, a display 4, a microphone 6, and a speaker unit 8. The image pickup unit picks up an image of a subject. Operation unit 2 includes a shutter button 2a for designating the image pickup operation, a TELE button 2b for zooming in to increase the image in size, and a WIDE button 2c for zooming out to decrease the image in size. The zooming process for increasing or decreasing the image in size is implemented by a driver 25 and an image pickup lens 22 (an optical system) based on the control by a CPU (Central Processing Unit) 36 shown in FIG. 2.

In the present embodiment, when the user applies pressure to TELE button 2b to press TELE button 2b, the zoom magnification is increased within the variable range thereof. In other words, based on the command from CPU 36, driver 25 changes the relative position of a plurality of image pickup lenses 22 within the operation range of the plurality of image pickup lenses 22, to thereby change the zoom magnification.

On the other hand, when the user applies pressure to WIDE button 2c to press WIDE button 2c, the zoom magnification is reduced within the variable range thereof. In other words, based on the command from CPU 36, driver 25 changes the relative position of the plurality of image pickup lenses 22 within the operation range of the plurality of image pickup lenses 22, to thereby change the zoom magnification.

It is to be noted that the increased amount or reduced amount of the zoom magnification is proportional to the length of the time period during which TELE button 2b or WIDE button 2c is being pressed. In other words, the increased amount of the zoom magnification is increased in accordance with an increase in the length of the time period during which TELE button 2b is being pressed. In contrast, the reduced amount of the zoom magnification is increased in accordance with an increase in the length of the time period during which WIDE button 2c is being pressed.

When a reproduction mode button 2d is pressed, electronic camera 10 is brought into the reproduction mode. Also, when a still image pickup mode button 2f is pressed, electronic camera 10 is brought into the still image pickup mode. When a moving image shooting mode button 2e is pressed, electronic camera 10 is brought into the moving image shooting mode.

A cursor key 2g is operated in four directions to select and designate items and the like shown in display 4. The user can designate a desired item and the like by pressing the center of cursor key 2g in the four directions. A menu button 2h is used to cause display 4 to show selectable items and the like.

Figure 2:
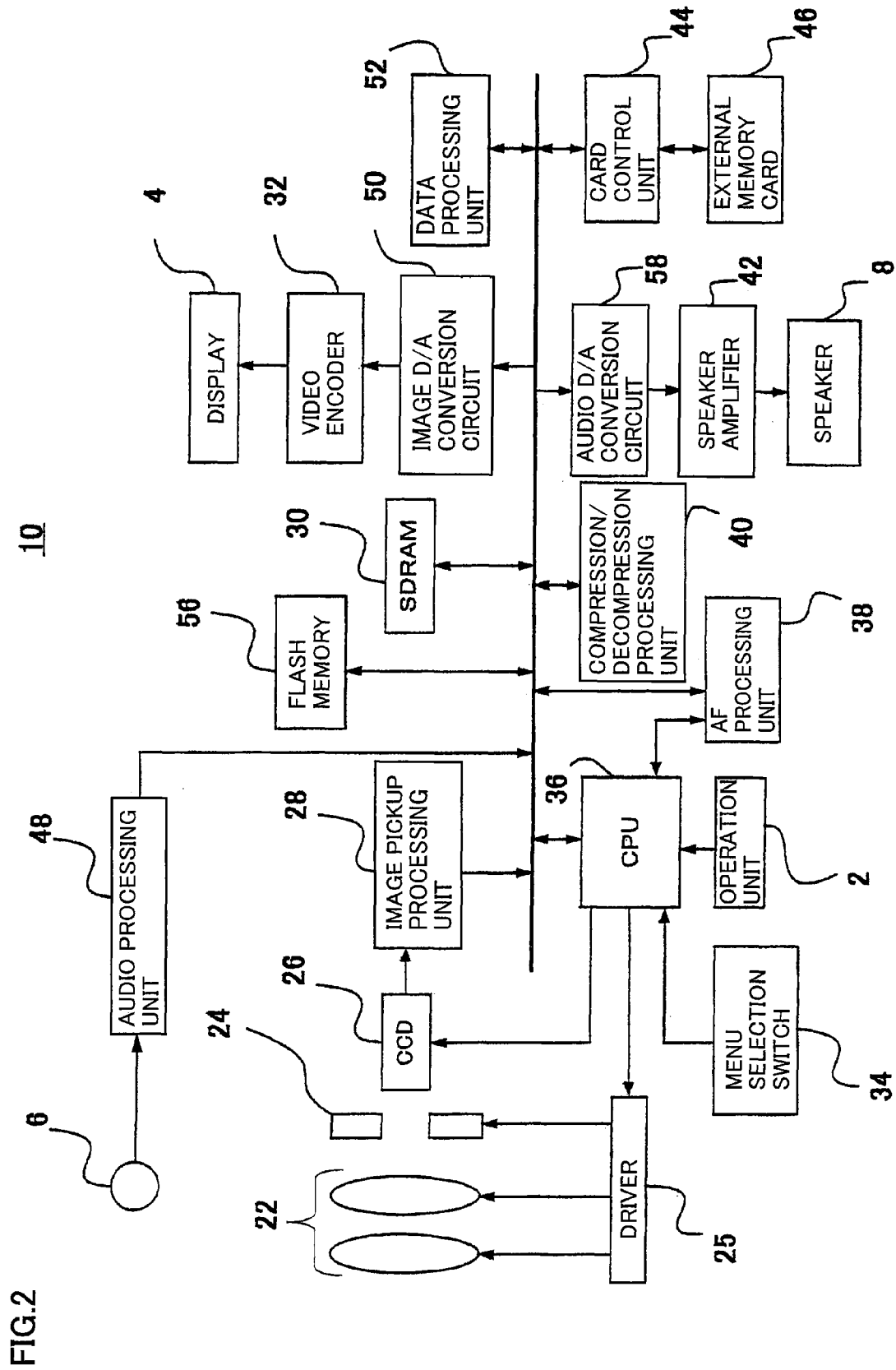
FIG. 2 is a block diagram showing the configuration of the electronic camera according to the present embodiment.

The internal structure of electronic camera 10 according to the present embodiment will then be described in detail. FIG. 2 is a block diagram showing the configuration of the electronic camera according to the present embodiment.

Referring to FIG. 2, electronic camera 10 includes operation unit 2, display 4, microphone 6, speaker unit 8, image pickup lens 22, a diaphragm mechanism 24, driver 25, a CCD imager (Charge Coupled Device Image Sensor) 26, an image pickup processing unit 28, an SDRAM (Synchronous Dynamic Random Access Memory) 30, a video encoder 32, a menu selection switch 34, CPU 36, an AF processing unit 38, a compression/decompression processing unit 40, a speaker amplifier 42, a card control unit 44, an audio processing unit 48, an image D/A conversion circuit 50, a data processing unit 52, a flash memory 56, and an audio D/A conversion circuit 58.

Image pickup lens 22 serves to form an optical image of the subject on the image pickup surface of CCD imager 26 which is an image pickup device. Based on the output signal of CCD imager 26, movement of image pickup lens 22 in the optical axis direction is adjusted. Image pickup lens 22 includes a zoom mechanism serving to zoom in or out for increasing or decreasing the size of the subject image to be picked up.

Diaphragm mechanism 24 is controlled by CPU 36 to adjust the light coming from image pickup lens 22 into CCD imager 26. Driver 25 adjusts the position and the operation of each of image pickup lens 22 and diaphragm mechanism 24.

The analog image pickup signal output from CCD imager 26 is input into image pickup processing unit 28. Image pickup processing unit 28 performs a predetermined process such as color separation, white balance adjustment and YUV conversion for the image represented by the analog image pickup signal. Image pickup processing unit 28 converts the analog image pickup signal from CCD imager 26 into a Y signal corresponding to a luminance signal, and U and V signals each corresponding to a color-difference signal.

CPU 36 is connected to operation unit 2, driver 25, image pickup processing unit 28, SDRAM 30, menu selection switch 34, AF (Auto Focus) processing unit 38, compression/decompression processing unit 40, speaker amplifier 42, card control unit 44, audio processing unit 48, image D/A conversion circuit 50, data processing unit 52, flash memory 56, and audio D/A conversion circuit 58. In accordance with the program stored in flash memory 56, CPU 36 controls image pickup processing unit 28, SDRAM 30, compression/decompression processing unit 40, speaker amplifier 42, card control unit 44, audio processing unit 48, image D/A conversion circuit 50, data processing unit 52, and audio D/A conversion circuit 58.

Then, the operation of electronic camera 10 will be described in detail. In the present embodiment, when the user inputs an operation command through operation unit 2, electronic camera 10 starts the operation.

As described above, operation unit 2 includes various buttons or keys 2a to 2h. In the still image pickup mode, CPU 36 picks up a still image in response to pressing of shutter button 2a. Image pickup lens 22, diaphragm mechanism 24, CCD imager 26, and image pickup processing unit 28 perform a predetermined process for the optical image of the subject for one frame. The digital image data including Y, U and V signals obtained by image pickup processing unit 28 is temporarily stored in SDRAM 30.

Compression/decompression processing unit 40 then compresses the digital image data for one frame stored in SDRAM 30 in the JPEG (Joint Photographic Experts Group) format by using a JPEG codec in the present embodiment. The compressed digital image data is again stored in SDRAM 30.

Furthermore, data processing unit 52 performs a process for reducing the size of the digital image data for one frame, thereby generating thumbnail data. The thumbnail data is stored in SDRAM 30. In compression/decompression processing unit 40, the thumbnail image is subjected to JPEG compression using the JPEG codec. The compressed thumbnail data is again stored in SDRAM 30.

CPU 36 controls card control unit 44 to record the compressed digital image data and the compressed thumbnail data as one still image file in an external memory card 46.

AF processing unit 38 integrates a high frequency component of the Y data generated in image pickup processing unit 28 for every frame. CPU 36 obtains the integration result, that is, a focus evaluation value. CPU 36 controls driver 25 based on the obtained focus evaluation value.

More specifically, CPU 36 and driver 25 adjust the position of optical lens 22 in the optical axis direction so as to achieve the maximum focus evaluation value. In other words, driver 25 adjusts the focus by changing the relative position of image pickup lens 22 to CCD 26 based on the command from CPU 36. Since a main subject may often be located near the center of the image screen, it is preferable to increase the weight with regard to the evaluation of the center portion.

Furthermore, in the moving image shooting mode, CPU 36 starts to shoot the moving image in response to pressing of shutter button 2a. CPU 36 continues to shoot the moving image, that is, to perform the moving image processing, until shutter button 2a is pressed again. For this moving image processing, CPU 36 continuously performs the still image pickup processing for 30 frames per second, for example. CPU 36 temporarily stores the digital image data including Y, U and V signals in SDRAM 30 by an amount corresponding to the time period of moving image shooting.

When the operation for ending the moving image shooting is performed, a plurality of continuous pieces of digital image data stored in SDRAM 30 is subjected to moving image compression by image compression/decompression processing unit 40 using a Motion JPEG codec. The compressed image data is again stored in SDRAM 30.

Furthermore, in the moving image shooting mode, CPU 36 also starts audio recording in response to pressing of shutter button 2a. In other words, audio processing unit 48 amplifies the audio signal from microphone 6 and converts the audio signal into digital audio data. Compression/decompression processing unit 40 compresses the digital audio data and stores the compressed audio data in SDRAM 30. The compressed audio data is stored in SDRAM 30 until the operation for ending the moving image shooting is performed.

Then, CPU 36 controls card control unit 44 to record the plurality of continuous pieces of compressed image data and compressed audio data in external memory card 46 as one moving image file.

When reproduction mode button 2d in operation unit 2 is pressed, CPU 36 reproduces the latest still image file or moving image file recorded in external memory card 46 through display 4 or speaker unit 8.

Specifically, when reproducing a still image file, CPU 36 controls card control unit 44 to temporarily store, in SDRAM 30, the compressed image data of the still image file recorded in external memory card 46. The compressed image data stored in SDRAM 30 is subjected to the decompression process by compression/decompression processing unit 40 using a JPEG codec.

The digital image data subjected to the decompression process is temporarily stored in SDRAM 30 and converted into an analog image signal by image D/A conversion circuit 50. Video encoder 32 converts the analog image data from image D/A conversion circuit 50 into a video signal to cause display 4 to show the converted video signal.

When reproducing a moving image file, CPU 36 controls card control unit 44 to temporarily store, in SDRAM 30, a plurality of pieces of compressed image data of the moving image file recorded in external memory card 46. The plurality of pieces of compressed image data stored in SDRAM 30 is subjected to the decompression process by image compression/decompression processing unit 40 using a Motion JPEG codec.

The plurality of pieces of digital image data subjected to the decompression process is then temporarily stored in SDRAM 30 and converted into an analog image signal by image D/A conversion circuit 50 in chronological order. Video encoder 32 converts the analog image data from image D/A conversion circuit 50 into a video signal to cause display 4 to show the converted video signal.

At the same time, the audio data in the moving image file recorded in external memory card 46 is subjected to the decompression process by compression/decompression processing unit 40. The digital audio data subjected to the decompression process is stored in SDRAM 30. The audio data stored in SDRAM 30 is converted into an analog audio signal by D/A conversion circuit 58. The analog audio signal is subjected to the amplification process in speaker amplifier 42 and then output to speaker unit 8 in synchronization with display of the video signal.

Figure 3:
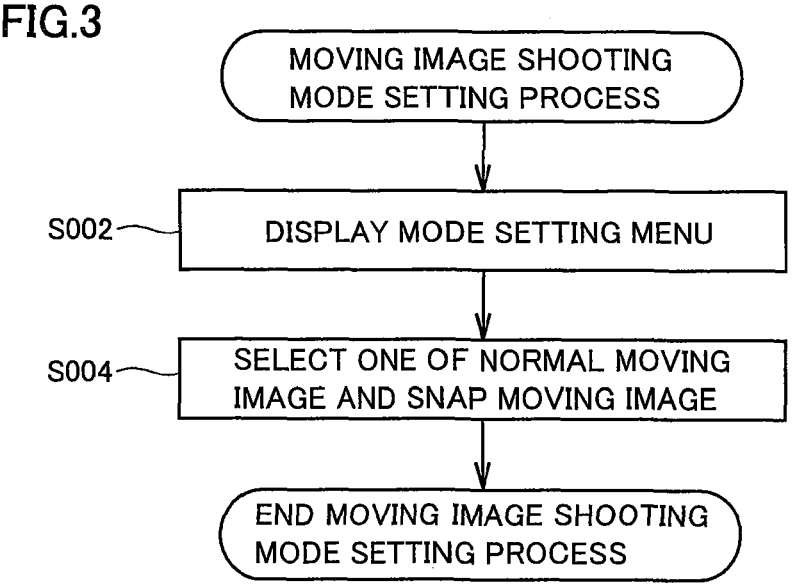
FIG. 3 is a flowchart illustrating the processing procedure of the moving image shooting mode setting process performed by a CPU of the electronic camera according to the present embodiment.
Figure 4:
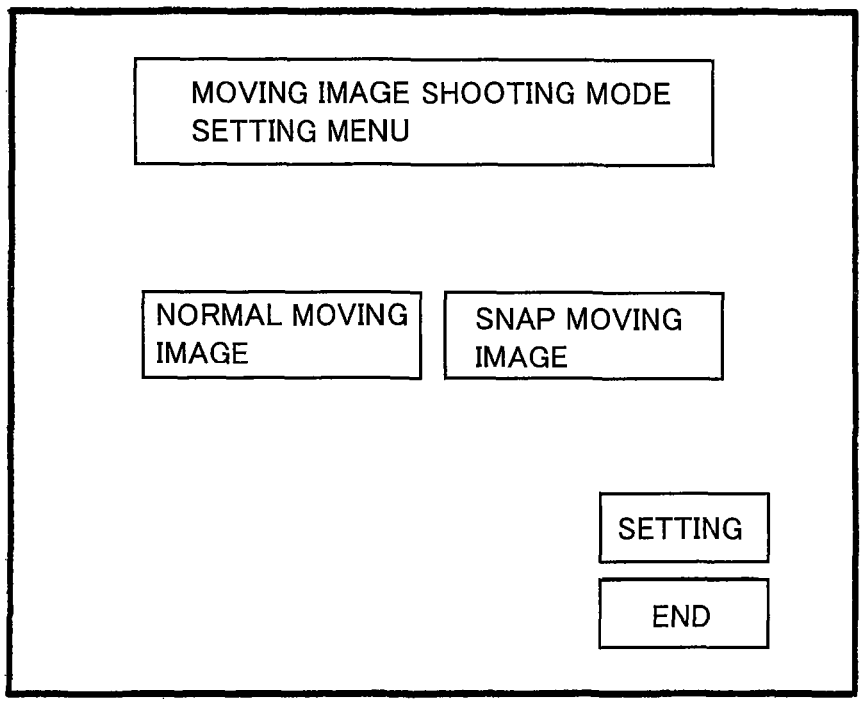
FIG. 4 is an image diagram showing a screen of a moving image shooting mode setting menu according to the present embodiment.
Figure 5:
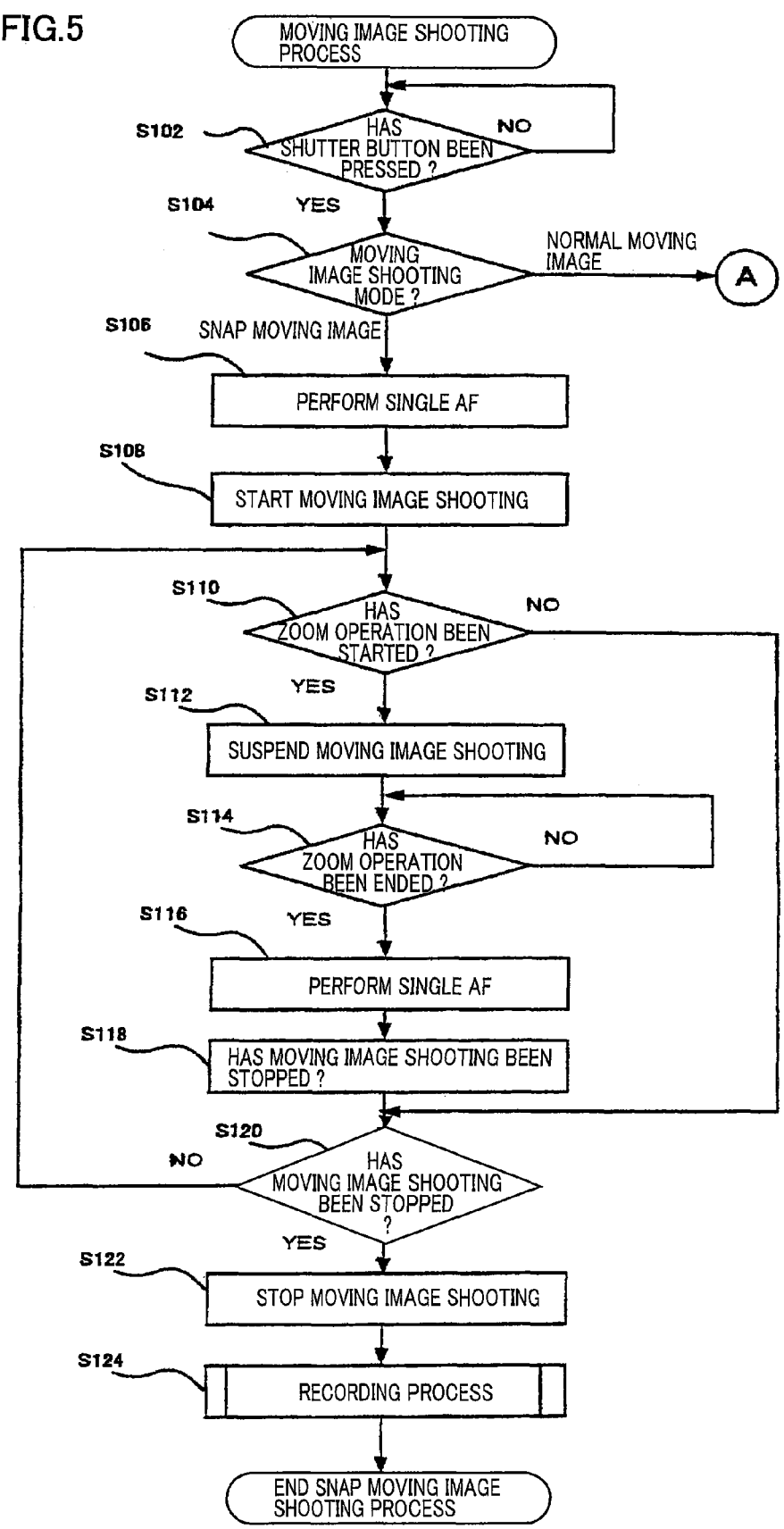
FIG. 5 is a flowchart illustrating the processing procedure of the CPU of the electronic camera in the snap moving image mode according to the present embodiment.

Then, the image pickup processing performed by CPU 36 of electronic camera 10 according to the present embodiment will be described in detail. FIG. 3 is a flowchart illustrating the processing procedure of the moving image shooting mode setting process performed by the CPU of the electronic camera according to the present embodiment. FIG. 4 is an image diagram showing the screen of the moving image shooting mode setting menu according to the present embodiment. FIG. 5 is a flowchart illustrating the processing procedure of the CPU of the electronic camera in the snap moving image mode according to the present embodiment. FIG. 6 is a flowchart illustrating the processing procedure of the CPU of the electronic camera in the normal moving image mode according to the present embodiment.

Referring to FIG. 3, the moving image shooting mode setting process will be first described.

When menu button 2h is pressed, CPU 36 receives a command to switch to the moving image shooting mode based on the operation performed on cursor key 2g in one of the four directions (selection operation) and the operation performed on the center portion of cursor key 2g (determination operation). CPU 36 then proceeds to step S002 and causes display 4 to show the mode setting menu as shown in FIG. 4.

In step S004, based on the operation performed on cursor key 2g in one of the four directions (selection operation) and the operation performed on the center portion of cursor key 2g (determination operation), CPU 36 selects one of the snap moving image mode and the normal moving image mode from the mode setting menu as shown in FIG. 4. In other words, CPU 36 receives a mode switching command through operation unit 2 from the user. CPU 36 then ends the moving image shooting mode setting process.

Then, referring to FIGS. 5 and 6, the moving image shooting process will be described.

CPU 36 determines in step S102 whether shutter button 2a has been pressed. When CPU 36 determines "NO" in step S102, it returns to step S102. When CPU 36 determines "YES" in step S102, it proceeds to step S104. In step S104, CPU 36 determines through operation unit 2 whether the "snap moving image mode" or the "normal moving image mode" is set as a moving image shooting mode.

In step S104, when CPU 36 determines that the "normal moving image mode" is set, it proceeds to step S202, which will be described later.

In step S104, when CPU 36 determines that the "snap moving image mode" is set, it proceeds to step S106. AF processing unit 38 integrates a high frequency component of the Y data generated in image pickup processing unit 28 for every frame. CPU 36 obtains the integration result, that is, a focus evaluation value. CPU 36 controls driver 25 based on the focus evaluation value. In other words, the position of optical lens 22 in the optical axis direction is adjusted so as to achieve the maximum focus evaluation value.

Thus, CPU 36 controls driver 25 to perform single autofocus processing for only one sequence for the current subject. In other words, the autofocus processing for only one sequence means that the position of optical lens 22 in the optical axis direction is adjusted only once based on plural frame images, so as to achieve the maximum focus evaluation value of the plural frame images. CPU 36 then proceeds to step S108 to start the moving image shooting process.

CPU 36 then proceeds to step S110. In step S110, CPU 36 determines whether one of TELE button 2b for zooming in to increase the image in size and WIDE button 2c for zooming out to decrease the image in size has been pressed or not. In other words, CPU 36 determines whether the zoom operation has been started or not.

When CPU 36 determines "NO" in step S110, it proceeds to step S120. In step S120, CPU 36 determines whether or not shutter button 2a has been pressed which is used for both starting and stopping the moving image shooting, that is, whether the moving image shooting has been stopped or not.

When CPU 36 determines "YES" in step S110, it proceeds to step S112 to suspend the moving image shooting process. The suspension of the moving image shooting process means that CPU 36 suspends storing, in SDRAM 30, of the digital image data including Y, U and V signals obtained by image pickup processing unit 28. Furthermore, when suspending the moving image shooting process, CPU 36 also suspends storing, in SDRAM 30, of the digital audio data corresponding to the audio signal obtained by microphone 6.

CPU 36 then proceeds to step S114 to determine whether the zoom operation has been ended. When determining "NO" in step S114, CPU 36 returns to step S114 and continues suspension of the moving image shooting process.

When determining "YES" in step S114, CPU 36 proceeds to step S116. In step S116, CPU 36 controls driver 25 to perform single autofocus processing for only one sequence for the current subject. In the subsequent moving image shooting, even when the scene to be shot is changed, the autofocus processing is not performed unless the zoom operation is carried out.

CPU 36 then proceeds to step S118 to resume the moving image shooting process. The resumption of the moving image shooting process means that CPU 36 stores, in SDRAM 30, the digital image data and audio data obtained after resumption of the shooting process in connection to the last data in the digital image data and audio data (the last data before suspension) temporarily stored in SDRAM 30.

CPU 36 then proceeds to step S120. In step S120, CPU 36 determines whether or not shutter button 2*a* has been pressed which is used for both starting and stopping the moving image shooting, that is, whether the moving image shooting has been stopped or not.

When determining "NO" in step S120, CPU 36 returns to step S110. When determining "YES" in step S120, CPU 36 proceeds to step S122 to stop the moving image shooting process and audio recording. CPU 36 then proceeds to step S124. In step S124, CPU 36 controls card control unit 44 to record, in external memory card 46, a plurality of pieces of compressed image data and audio data stored in SDRAM 30 as one moving image file. CPU 36 then ends the snap moving image shooting process.

On the other hand, in step S104, when CPU 36 determines that the "normal moving image mode" is set, it proceeds to step S202 in FIG. 6.

In step S202, AF processing unit 38 integrates a high frequency component of the Y data generated in image pickup processing unit 28 for every frame. CPU 36 obtains the integration result, that is, a focus evaluation value. CPU 36 controls driver 25 based on the obtained focus evaluation value. In other words, the position of optical lens 22 in the optical axis direction is adjusted so as to achieve the maximum focus evaluation value.

Thus, CPU 36 controls driver 25 to continuously perform the autofocus processing for the subject to be shot. The continuous autofocus processing means that the position of optical lens 22 in the optical axis direction is continuously adjusted based on continuously obtained plural frame images, so as to achieve the maximum focus evaluation value of the plural frame images. CPU 36 then proceeds to step S204 to start the moving image shooting process.

CPU 36 then proceeds to step S206. In step S206, CPU 36 determines whether one of TELE button 2*b* for zooming in to increase the image in size and WIDE button 2*c* for zooming out to decrease the image in size has been pressed or not, that is, whether the zoom operation has been started or not. When determining "NO" in step S206, CPU 36 proceeds to step S210 to determine whether or not shutter button 2*a* has been pressed which is used for both starting and stopping the moving image shooting, that is, whether the moving image shooting has been stopped or not.

When determining "YES" in step S206, CPU 36 proceeds to step S208 to determine whether the zoom operation has been stopped. When determining "NO" in step S208, CPU 36 repeats the process in step S208. When determining "YES" in step S208, CPU 36 proceeds to step S210 to determine whether or not shutter button 2*a* has been pressed which is used for both starting and stopping the moving image shooting, that is, whether the moving image shooting has been stopped or not.

When determining "NO" in step S210, CPU 36 returns to step S206. When determining "YES" in step S210, CPU 36 proceeds to step S212. In step S212, CPU 36 controls driver 25 to stop the autofocus processing continuously performed for the subject.

CPU 36 then proceeds to step S214 to stop the moving image shooting process and audio recording. CPU 36 then proceeds to step S216. In step S216, CPU 36 controls card control unit 44 to record, in external memory card 46, a plurality of pieces of compressed image data and audio data stored in SDRAM 30 as one moving image file. CPU 36 then ends the normal moving image shooting process.

As described above, in the case of the moving image shooting in the "snap moving image mode", electronic camera 10 according to the present embodiment automatically interrupts recording of the moving image for the time period during which the zoom operation is performed. Furthermore, by performing the autofocus processing for one sequence only upon starting of the moving image shooting and upon termination of the zoom operation, electronic camera 10 can record a moving image with little noise because sound caused by driving the lens in the zoom or focus operation is not recorded.

Furthermore, in the case of the moving image shooting in the "snap moving image mode", the image obtained during the zoom operation is not recorded, which allows creation of a compact moving image file suitable for posting on a homepage of a website or on a video-sharing site.

Furthermore, with regard to the moving image shooting in the "snap moving image mode", for example, the entire scene including a main subject to be shot is first captured on the wide angle side and then zoomed in to take a close-up picture of the main subject. In this case, when the obtained moving image is reproduced, the wide scenery image is first reproduced for a few seconds and then instantaneously changed to the close-up image. The moving image according to the present embodiment has special effects as described above.

It is to be noted that although the foregoing embodiments have been described using a CCD imager as an image pickup device, the image pickup device is not limited thereto, but other image pickup devices such as a CMOS sensor (Complementary Metal Oxide Semiconductor), for example, may be applied to achieve the similar configuration.

Furthermore, although the foregoing embodiments have been described using a Motion JPEG codec as a compression/decompression codec for the moving image, the compression/decompression codec is not limited thereto, but other codecs such as an MPEG codec, for example, may be applied to achieve the similar configuration. Furthermore, although an external memory card has been described as a recording medium in the foregoing embodiments, other recording media such as an incorporated hard disk may be applied, for example.

Furthermore, the electronic camera may be provided which allows the zooming process and the AF process by displacing the CCD imager in the optical axis direction in the state where the lens is fixed.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image pickup apparatus comprising:
an image pickup unit which forms a subject image on an image pickup device through an optical system to generate an image pickup signal;
an adjustment unit which changes an optical zoom magnification with respect to said subject image; and
a control unit which records image data as a moving image in a memory in response to a moving image recording command, said image data being obtained based on said image pickup signal, and stops recording the moving image for a time period during which said zoom magnification is changed,
wherein said adjustment unit adjusts a focus by adjusting the relative position of said optical system to said image pickup device upon starting of recording of said moving image and upon termination of the time period during which said zoom magnification is changed.

2. The image pickup apparatus according to claim 1, wherein, in response to a switching command, said control unit switches between a first mode in which recording of said moving image is stopped for the time period during which said zoom magnification is changed, and a second mode in which said moving image is recorded even for the time period during which said zoom magnification is changed.

3. An image pickup apparatus, comprising:
an image pickup unit which forms a subject image on an image pickup device through an optical system to generate an image pickup signal;
an adjustment unit which changes an optical zoom magnification with respect to said subject image; and
a control unit which records image data as a moving image in a memory in response to a moving image recording command, said image data being obtained based on said image pickup signal, and stops recording the moving image for a time period during which said zoom magnification is changed,
wherein, in response to a switching command, said control unit switches between a first mode in which recording of said moving image is stopped for the time period during which said zoom magnification is changed, and a second mode in which said moving image is recorded even for the time period during which said zoom magnification is changed, and
said adjustment unit, in said first mode, adjusts a focus by adjusting the relative position of said optical system to said image pickup device upon starting of recording of said moving image and upon termination of the time period during which said zoom magnification is changed, and, in said second mode, adjusts the focus by continuously adjusting said relative position during recording of said moving image.

4. An image pickup method of an image pickup apparatus, said image pickup apparatus including
an image pickup unit which forms a subject image on an image pickup device through an optical system to generate an image pickup signal,
an adjustment unit which changes an optical zoom magnification with respect to said subject image, and
a control unit,
said image pickup method comprising the steps of:
said control unit recording image data as a moving image in a memory in response to a moving image recording command, said image data being obtained based on said image pickup signal;
said control unit stopping recording said moving image for a time period during which said zoom magnification is changed; and
said adjustment unit adjusting a focus by adjusting the relative position of said optical system to said image pickup device upon starting of recording of said moving image and upon termination of the time period during which said zoom magnification is changed.

5. The image pickup method according to claim 4, further comprising the step of, in response to a switching command, said control unit switching between a first mode in which recording of said moving image is stopped for the time period during which said zoom magnification is changed, and a second mode in which said moving image is recorded even for the time period during which said zoom magnification is changed.

6. An image pickup method of an image pickup apparatus, said image pickup apparatus including:
an image pickup unit which forms a subject image on an image pickup device through an optical system to generate an image pickup signal,
an adjustment unit which changes an optical zoom magnification with respect to said subject image, and
a control unit,
said image pickup method comprising the steps of:
said control unit recording image data as a moving image in a memory in response to a moving image recording command, said image data being obtained based on said image pickup signal;
said control unit stopping recording said moving image for a time period during which said zoom magnification is changed;
in response to a switching command, said control unit switching between a first mode in which recording of said moving image is stopped for the time period during which said zoom magnification is changed, and a second mode in which said moving image is recorded even for the time period during which said zoom magnification is changed;
in said first mode, said adjustment unit adjusting a focus by adjusting the relative position of said optical system to said image pickup device upon starting of recording of said moving image and upon termination of the time period during which said zoom magnification is changed; and
in said second mode, said adjustment unit adjusting the focus by continuously adjusting said relative position during recording of said moving image.

\* \* \* \* \*